R. J. MUIR.
TRACTION WHEEL.
APPLICATION FILED AUG. 2, 1913.

1,100,902.

Patented June 23, 1914.

Witnesses:
Theo. Lagaard.
R. W. Muir.

Inventor:
Robert J. Muir
By F. A. Whiteley
his Attorney.

UNITED STATES PATENT OFFICE.

ROBERT J. MUIR, OF MINNEAPOLIS, MINNESOTA.

TRACTION-WHEEL.

1,100,902.  Specification of Letters Patent.  Patented June 23, 1914.

Application filed August 2, 1913. Serial No. 782,675.

*To all whom it may concern:*

Be it known that I, ROBERT J. MUIR, a citizen of the United States, residing at Minneapolis, in the county of Hennepin and State of Minnesota, have invented certain new and useful Improvements in Traction-Wheels, of which the following is a specification.

My invention relates to improvements in traction wheels and has for its object to provide a wheel the mud lugs of which may be caused to project at one side of the wheel and be retracted at the other side.

A further object is to provide a wheel that will be self cleaning.

It is a well known fact that the present traction wheel is not readily and easily adapted to meet different conditions of the road which it has to travel. By my invention I obviate this and furnish a traction wheel which may be set with regard to the local conditions.

The full objects and advantages of my invention will appear in connection with the detailed description thereof and are particularly pointed out in the claims.

Figure 1:
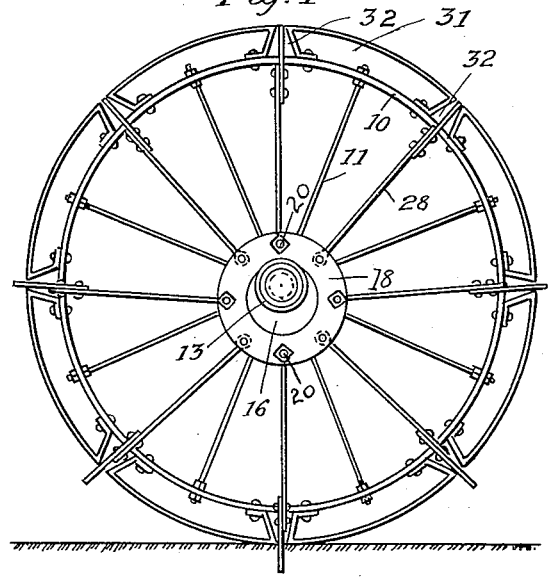
Figure 2:
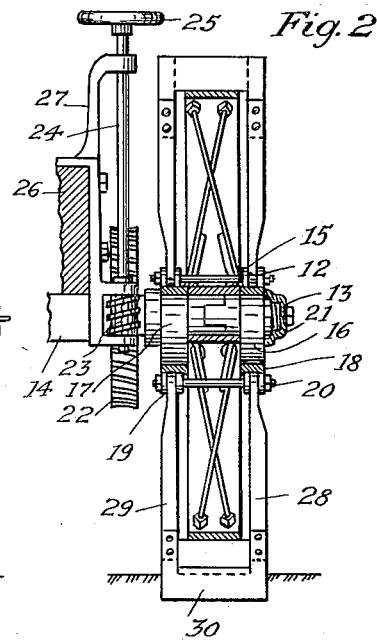
Figure 3:
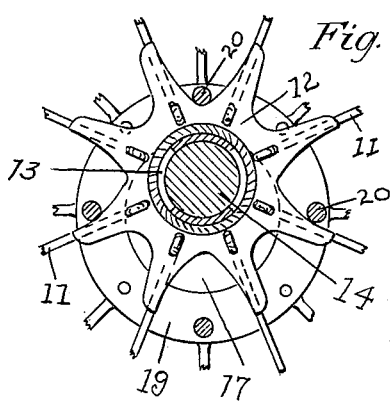
Figure 6:
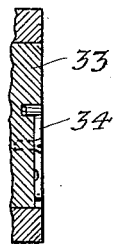
Figure 4:
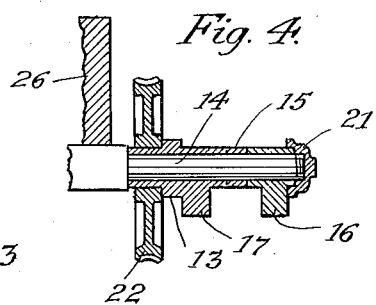
Figure 5:
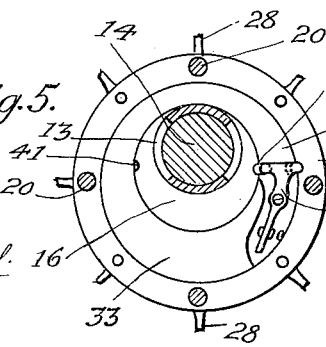
Figure 7:
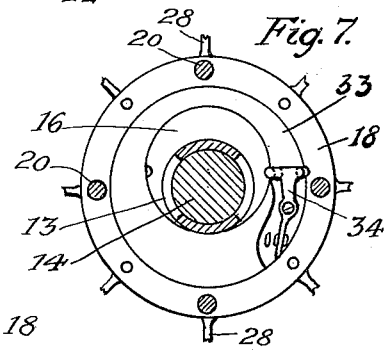

In the drawings, illustrating the operation of my invention in one form, Figure 1 is a side elevation of my invention. Fig. 2 is an end section through the center of the wheel. Figs. 3 and 4 are detail views, and Figs. 5, 6 and 7 show a modification.

A traction wheel of usual construction has a rim 10 supported by its spokes 11 upon hub 12. A casing 13 is mounted on axle 14 and is preferably constructed divided into two parts dovetailed together, as shown in Fig. 2. The casing 13 has a central bearing 15 upon which the hub of the traction wheel proper is fitted. Adjacent each end of casing 13 are eccentric rings 16 and 17 which are formed integral with the casing. Mounted upon the two eccentric rings 16 and 17 are collars 18 and 19 which are fastened to each other by bolts 20. A cap 21 holds the two parts of the casing 13 in fixed relation. A gear wheel 22 is rigidly mounted on casing 13 adjacent its inner end. The gear screw 23 is mounted in operative connection with gear wheel 22 and is connected by means of a shaft 24 to a hand wheel 25, the whole being held rigidly fastened against frame piece 26 by means of bracket 27. Fastened to collars 18 and 19 are radial rods 28 and 29. Radial rods 28 and 29 are rigidly fastened to mud lugs 30. Upon the circumference of rim 10 are mounted members which are curved to conform to the circumference and are of such height as to permit the lug 30 to be flush with the top of the members when fully withdrawn. Apertures 32 are left between each member 31 to permit the ready sliding of the lugs 30.

In the modified form shown, a second eccentric 33 is mounted on eccentric 16 and is provided with a clutch 34 which permits the eccentric 33 to be locked to either the collar 18 or the inner eccentric 16, as may be desired. Normally the clutch 34 will be operated so as to lock eccentric 33 to eccentric 16, when both eccentrics so locked together will be controlled by the hand wheel 25 and worm wheel 23. The purpose of locking the eccentric 33 to the ring 18 is to move said eccentric with said wheel about the eccentric 16 so that a change of relative positions of the two eccentrics may be effected. Two notches 40 and 41 are shown at diametrically opposite positions in eccentric 16. When the latch 34 enters one of these notches, when the same is in the position indicated in Fig. 5, the two eccentrics are relatively positioned so as to operate upon the mud lugs and reciprocate the same back and forth; but when the inner eccentric 16 is turned about a half revolution in the outer eccentric 33, as indicated in Fig. 7, the eccentricity of one of said eccentrics is oppositely positioned with respect to that of the other and said eccentrics will mutually neutralize each other so that ring 18 will move about the axial center of the wheel hub and therefore the mud lugs will not be reciprocated and will be held extended to one-half the maximum possible distance outside of the wheel tire.

As above pointed out, in the operation of my invention the eccentric or the pair of eccentrics controlled by hand wheel 25 and connections may be turned so as to cause the ring 18 to project the mud lugs from the bearing face of the wheel at the down point thereof a greater or less distance from the maximum possible distance to none at all, as may be desired.

When used in loose soil or ungraded dirt roads the mud lugs will be projected at the bottom a greater or less extent and retracted at the top, thus operating to give the proper grip on the soil and at the same time cleaning the earth from the lugs. If, however, it is desired to drive the traction engine over pavements or graded roads in which the presence of lugs would be injurious to the roadway, the eccentrics may be operated so as to project the lugs only at the top of the wheel and have them fully retracted at the bottom of the wheel giving a smooth bearing surface to the tire.

I claim:

1. A traction wheel comprising a tire and mud lugs relatively movable with respect thereto, a hub, an independently movable casing within said hub, an eccentric ring integrally formed against each end of said casing, a collar rotatably mounted on each eccentric, arms extending from the ends of the lugs and being pivotally connected with the respective collars, and means for rotating said casing in the hub.

2. A traction wheel comprising a tire and mud lugs relatively movable with respect thereto, said lugs extending outside of the planes of the sides of the tire, a hub, an independently movable casing within said hub, a member engaging portions of the casing, said portions being positioned relative to the hub and said member so that movement of the casing will cause movement of the member, connections from the ends of the lugs outside of the tire to the member, and means for moving the casing to cause the member to project the lugs at one side of the wheel and retract them at the other side.

3. A traction wheel comprising a tire and mud lugs relatively movable with respect thereto, said lugs extending outside of the planes of the sides of the tire, a hub, a casing independently movable within said hub, an eccentric ring integrally formed adjacent each end of said casing, a collar rotatably mounted on each of said eccentrics, two sets of rods pivotally connected respectively with the collars and with the respective ends of the lugs outside the edges of the tire, and means for operating the casing.

4. A traction wheel comprising an integral circumferential tire, a supplemental tire spaced therefrom and formed of circumferentially curved members mounted on the tire, the ends of said members being separated by narrow and inwardly divergent spaces, mud lugs within said spaces extending across and outside of the side limits of the integral tire in position to be projected through said spaces outside of the peripheral limits of said supplemental tire, and means for simultaneously moving all said lugs to project the same at one side of the wheel and retract them at the other side.

5. A traction wheel comprising a tire and mud lugs relatively movable with respect thereto, a hub, an independently movable casing within said hub, an eccentric ring integrally formed adjacent each end of said casing, said casing being divided into two parts between the eccentric rings and formed to fit in fixed relation to each other, connections from the collars to the lugs, and means for actuating the eccentrics to project the lugs at one side of the wheel and be retracted at the other side.

6. A traction wheel comprising a tire and mud lugs relatively movable with respect thereto, a hub, an independently movable casing within said hub, an eccentric ring integrally formed adjacent each end of said casing, said casing being in two parts dovetailed together between the eccentric rings, a cap mounted on the outer end of the axle to hold the two parts together, connections from the collars to the lugs, and means for actuating the eccentrics to project the lugs at one side of the wheel and retract them at the other side.

7. A traction wheel comprising a tire and mud lugs relatively movable with respect thereto, circumferentially curved members mounted on said tire, the members being spaced apart sufficiently to permit the lugs to be readily operated between the spaces, and means for moving the lugs to project them at one side of the wheel and retract them at the other.

In testimony whereof I affix my signature in presence of two witnesses.

ROBERT J. MUIR.

Witnesses:
F. A. WHITELEY,
H. A. BOWMAN.

---

Copies of this patent may be obtained for five cents each, by addressing the "Commissioner of Patents, Washington, D. C."